2,982,759

SYNTHETIC ELASTOMERS

Ralph Otto Heuse, Beaumont, Tex., assignor to E. I. du Pont de Nemours and Company, Wilmington, Del., a corporation of Delaware No Drawing. Filed Oct. 20, 1958, Ser. No. 768,030

10 Claims. (Cl. 260—79.3)

This invention relates to synthetic elastomers and more particularly to chlorosulfonated high density polyethylenes containing high proportions of chlorine which have good rubber-like properties and exceptional resistance to solvents, particularly superior high resistance to the swelling action of oils.

Polyethylenes react with a mixture of chlorine and sulfur dioxide (see Patent No. 2,212,786 of McQueen) to give products in which some of the hydrogens of the original polyethylene have been replaced by chlorine and by sulfonyl chloride, —$SO_2Cl$, groups, their relative proportions depending on the ratio of chlorine and sulfur dioxide employed. This process is referred to as chlorosulfonation. According to Patent 2,416,060 and Patent 2,416,061 of McAlevy et al., some of these products are rubbery and may be cured by heating with certain metal oxides, giving products having physical properties somewhat like those of vulcanized natural rubber. In a later patent, No. 2,586,363 of McAlevy, it is shown that these rubber-like properties are developed when the chlorine content is between 25 and 37% (and preferably between 27 and 30%), the sulfur content is between 0.4 and 3.0% and the polymer prior to chlorosulfonation is soluble in toluene and has a molecular weight above 10,000. Chlorosulfonated products containing more than these proportions of chlorine are described in the patent as being somewhat rubbery but stiff. The said patent discloses the chlorosulfonation of normally solid polymers of ethylene generally, and of polymethylenes (from $CO+H_2$), with specific reference to the polymers made by the process of Patents 2,153,553, 2,188,465, etc. The latter have had densities in the range of 0.914 to 0.930.

Further investigation of these prefered products of the McAlevy patent, No. 2,586,363, in the cured state has shown that their physical properties are in general satisfactory and that they are outstanding in resistance to chemical attack, particularly by ozone and by atmospheric oxygen. Their resistance to the swelling action of mineral and vegetable oils and of organic solvents, however, although good and in fact much better than for natural rubber, is not outstanding like the chemical resistance. Service conditions often involve swelling by oils and solvents as well as chemical attack. There is a general need for more highly solvent-resistant elastomers of good physical properties.

It is an object of this invention to provide curable chlorosulfonated normally solid polyethylenes having significantly improved resistance to the swelling action of oils and organic solvents without sacrifice of elastomeric and other desirable properties. Another object is to provide such chlorosulfonated polyethylenes which contain high proportions of chlorine but which are not hard and stiff in either the cured or the uncured state. Still further objects are to provide new compositions of matter and to advance the art.

The above and other objects may be accomplished according to this invention which comprises a curable homogeneously chlorosulfonated polyethylene having a chlorine content of from 38% to about 48% by weight and a sulfur content of from 0.1% to 3.0% by weight, the polyethylene prior to chlorosulfonation having a density of from 0.935 to about 0.960, a melt index of from 0.2 to about 200, and a solubility in carbon tetrachloride at 110° C. to 125° C. of at least 1% by weight.

All of the homogeneously chlorosulfonated polyethylenes as above defined show greatly improved resistance to the action of oils and organic solvents but have good elastomeric properties comparable to the materials containing less than 37% chlorine disclosed by McAlevy in Patent No. 2,586,363. While the introduction of more than 37% chlorine in the products of McAlevy renders the products rubbery, they in general are too stiff at the higher chlorine contents. On the other hand, the products of this invention are not hard or stiff in either the cured or the uncured state. In other words, it has been found that polyethylenes characterized by a density of from 0.935 to about 0.960, and having the other properties herein specified, can be homogeneously chlorosulfonated to yield products of higher chlorine content without rendering them hard and stiff, but which have excellent rubber properties combined with superior resistance to swelling.

The polyethylene, prior to chlorosulfonation, is normally solid and must have a density of from 0.935 to about 0.960 and most preferably from about 0.945 to about 0.960 for best rubber-like properties. Also, polyethylene having a narrow molecular weight distribution corresponding to a ratio of weight average molecular weight to number average molecular weight, $M_w/M_n$, between 1 and 25, and in particular between 2 and 10 is preferred, although polyethylenes with higher ratios are also suitable. Except where otherwise specifically designated, the references to molecular weight hereinafter means weight average molecular weight. The polyethylenes, which are chlorosulfonated to produce the products of this invention, can be made for example by the methods disclosed in United States Patents No. 2,762,-791 and 2,816,883, as well as by the so-caled coordination polymerization as described in United States Patents Nos. 2,799,668, 2,822,357 and 2,839,518. The polyethylene, used as a starting material, however, is not confined to products of any specific processes, such as the above. Any polyethylene, corresponding to the above definition, is suitable.

Furthermore, the polyethylene should hve a molecular weight of at least about 10,000. However, its molecular weight should not be so high that all or part of it is insoluble or substantially insoluble in organic solvents such as carbon tetrachloride, but should be soluble in carbon tetrachloride, having a solubility therein of at least 1% by weight. That is, the polyethylene should be completely soluble in carbon tetrachloride at a temperature in the range of about 110° C. to about 125° C. and to such an extent as to provide solutions containing the polyethylene in a concentration of at least 1% of the total weight of the solution.

Ordinarily, it is more convenient to use the directly determined melt index as a measure of the size of the molecule. The melt index of the polyethylenes, given hereinafter, is the amount of melted polymer extruded at constant pressure and temperature in a given time through a standard orifice and was determined according to ASTM–D–1238–52T. This melt index is a rough but convenient measure of the molecular weight and varies inversely as the molecular weight, the higher melt index numbers corresponding to the lower molecular weights. The approximate weight average molecular weights (based on the determination of light scattering which is believed to be more reliable than earlier methods) corresponding to the melt indices of the polyethylenes employed in the examples are as follows:

| Melt index: | Mol. wt. (wt. average) |
|---|---|
| 0.2 | 175,000 |
| 0.5 | 130,000 |
| 1 | 105,000 |
| 2 | 85,000 |
| 5 | 65,000 |
| 15 | 45,000 |
| 20 | 41,000 |
| 22 | 40,000 |
| 80 | 27,000 |
| 200 | 20,000 |

The values in the above table apply particularly to polyethylenes with densities in the preferred range. The polyethylenes employed in this invention should have a melt index between 0.2 and 200, preferably from about 0.2 to about 20.

The molecular weight, or melt index, of the polyethylene to be chlorosulfonated has no important effect upon the solvent resistance of the products but do influence their plasticity and tackiness before curing and their modulus and tensile strength when cured. The higher molecular weights and lower melt indices give the lower plasticity and tack and the higher tensile strength.

The chlorosulfonated polyethylenes of this invention must contain at least 38% by weight of chlorine and may contain up to about 48% chlorine, preferably from 38% to 42% and from 0.1% to 3.0% by weight of sulfur, preferably from about 0.3% to about 1.2% sulfur. As the sulfur content increases within this range, the elongation decreases and the modulus and waterswell increase. As the chlorine content is increased within these limits, the solvent resistance of the cured material further increases to some extent but the physical properties, which are those of true rubber-like elastomers, will vary by only a small extent within this range of chlorine content. In the uncured state, however, the products with the lower amount of chlorine within this range, are somewhat more plastic. The determination of the amount of chlorine to be introduced in any specific case, while not critical within the range of 38% to 48%, will therefore depend largely upon the particular level of plasticity and solvent resistance desired in the products. Increase in the sulfur content in the chlorosulfonated products of this invention produces the same effect as described by McAlevy in Patent 2,586,363, that is, it increases the ease of curing. When the sulfur content is much below 0.1%, curing with metal oxides is difficult. On the other hand, when the sulfur content is increased much above about 3%, the curing is so rapid that scorching is a problem. The ease of curing also increases with increase in molecular weight.

In order to obtain a product having the required rubber-like properties from polyethylenes of the character herein specified, it is essential that the polyethylene be homogeneously chlorosulfonated, that is, that all of the polyethylene contain amounts of chlorine and sulfur within the specified ranges. The homogeneously chlorosulfonated polyethylenes are obtained by chlorosulfonating the polyethylene while it is in solution in a common inert solvent such as carbon tetrachloride and tetrachloroethylene. When the polyethylenes of the specified character are similarly treated with chlorine and sulfur dioxide while the polyethylene is in the form of a finely divided powder or in the form of finely divided particles suspended but not dissolved in an inert liquid medium or gas, the product is heterogeneously chlorosulfonated, part of the polyethylene being very highly chlorosulfonated (over-chlorosulfonated) and part being underchlorosulfonated or not chlorosulfonated, and is a resinous pulverulent material having no or substantially no rubber-like properties.

Preferably, the homogeneously chlorosulfonated polyethylenes of this invention are prepared by passing chlorine and sulfur dioxide, in admixture or separately in order, into a solution of the polyethylene in carbon tetrachloride, tetrachloroethylene, or the like, as by the methods disclosed by McAlevy in United States Patent No. 2,586,363. It is usually advantageous to promote the reaction by means of a source of free radicals such as the organic peroxides or the aliphatic azo compounds described for such purpose by Ernsberger in United States Patent 2,503,252 and, in general, the products hereinafter described were so made. The use of temperatures in the range of 90° C. to 125° C. (above the boiling point of the reaction mixture at atmospheric pressures) is often advantageous, particularly for the chlorination step and is achieved by operating under pressure, venting off the by-product hydrogen chloride if desired. The chlorination and chlorosulfonation procedures may be carried out either as batch operations or continuously.

The chlorosulfonated products may be isolated from the reaction mixture, for example, by removing the solvent by steam distillation as described by Ludlow in U.S. Patent 2,592,814, in which a stream of the solution is introduced transversely into a steam jet submerged in an alkaline solution of a dispersing agent, whereby the products are atomized and freed of carbon tetrachloride, forming granular particles. The product may also be isolated conveniently when carbon tetrachloride, for example, is the solvent by using a drum drier operated at a temperature between 100° C. and 200° C., whereby the product forms a porous layer containing little or no carbon tetrachloride and is readily removed from the drums as a self-supporting sheet as described by James Kalil in his copending application Ser. No. 566,166, filed February 17, 1956.

The chlorosulfonated polyethylenes of this invention may be compounded and cured in the manner known to the art for the compounding and curing of chlorosulfonated polyethylenes of lower density, particularly as disclosed by McAlevy et al. in United States Letters Patent No. 2,416,060 and No. 2,416,061.

The specific procedures for carrying out the chlorosulfonation, for the isolation of the chlorosulfonated polyethylene from the reaction mixtures, and for the compounding and curing of the chlorosulfonated polyethylenes of this invention, form no part of the present invention.

In order to more clearly illustrate this invention preferred modes of carrying the same into effect and the advantageous results to be obtained thereby, the following examples are given in which the parts are by weight except where specifically indicated otherwise.

EXAMPLE 1

One hundred parts by weight of a polyethylene of density 0.935, melt index 20 and $M_w/M_n$ ratio about 5.86, made by polymerizing ethylene at 22,000 pounds per sq. in. pressure at 150° C., in the presence of an azo catalyst, was introduced with 1400 parts by weight of carbon tetrachloride into a glass-lined autoclave provided with a reflux condenser and a valve for automatically venting gas when the pressure became greater than a predetermined value. The carbon tetrachloride was first refluxed at atmospheric pressure to remove traces of water which was removed from the condensate without returning to the autoclave. Azo diisobutyronitrile catalyst (0.06 part) was then added and the mass was stirred and heated at 15 pounds gauge pressure to about 102° C. for one-half hour to dissolve the polymer. Chlorine was then introduced through the agitated solution at such a rate that the desired amount of chlorination would take place in about 3 hours, in this case, about 70 parts per hour, with 60% utilization of the chlorine under these conditions. Hydrogen chloride and unreacted chlorine were vented to maintain the pressure at 15 pounds gauge. The temperature of the reaction mass was about 91° C. After 1.5 hours, the introduction of sulfur dioxide was started at such a rate as to introduce the desired amount of sulfur during the remaining 1.5 hours, in this case about 26 parts per hours, with 10% utilization of the sulfur dioxide. The temperature during this part of the reaction was reduced to 65° C. At the end of the reaction, the chlorine, sulfur dioxide, and hydrogen chloride remaining in the solution were boiled out and 2.4 parts of the condensation product of two mols of epichlorhydrin with one mol of propane-2,2-bisphenol was added. The chlorosulfonated polymer was isolated by drum-drying, using a double-roll, steam heated drier with both rolls 8 inches wide and 6 inches in diameter. The carbon tetrachloride solution was introduced between the rolls, the solvent evaporated on the surface of the rolls (heated to 135° C. and rotated at 2 r.p.m.) and the dried product was removed by doctor knives at points remote from the nip of the rolls where the solution was introduced.

The product contained 39.2% chlorine and 1.2% sulfur and was light colored, plastic, and readily milled.

EXAMPLE 2

Using a polyethylene of density 0.954, melt index 15 and $M_w/M_n$ ratio about 5.6, made at 50° C. and approximately atmospheric pressure, by the use of a catalyst obtained by treating titanium tetrachloride with tridecyl aluminum, and chlorosulfonating as in the previous example, a product containing 39.2% chlorine and 1.2% sulfur was obtained. It was similar in physical properties and appearance to the product of Example 1.

EXAMPLE 3

Similarly, polyethylenes with other melt indices and $M_w/M_n$ ratios were chlorosulfonated to various degrees, as indicated in Tables I and II. Elastomers numbered 7, 8 and 9 in Table I are chlorosulfonated polyethylenes which were prepared from polyethylenes having densities from 0.916–0.925, melt indices from 10–72 and $M_w/M_n$ ratios between 10 and 30, which are representative of the polyethylenes and products of McAlevy Patent 2,586,363 and which are outside the scope of the present invention but which are included for comparison.

The quantities given in the tables were determined by conventional methods. The Mooney viscosities were determined on the compounded stocks.

The products of Examples 1 and 2 and the several other chlorosulfonated polyethylenes were compounded, cured, and tested with the results shown in Tables I, II and III. The following test compound was used for the cholorosulfonated polyethylenes in Tables I and II, and compound B was used for the chlorosulfonated polyethylenes of Table III. Test compounds C and D were used for a commercial polychloroprene and for a commercial butadiene-acrylonitrile copolymer, respectively, included in Table II for comparison. The cure was for 30 min. at 307° F. (152° C.) throughout.

|  | A | B | C | D |
|---|---|---|---|---|
| Elastomer | 100 | 100 | 100 | 100 |
| Hydrogenated rosin | 2.5 | 2.5 |  |  |
| Stearic acid |  |  |  | 1.0 |
| Titanium dioxide | 25 |  |  |  |
| Carbon black (SRF) |  | 25 | 32 | 35 |
| Litharge |  | 40 |  |  |
| Magnesium oxide | 20 |  | 4.0 |  |
| Zinc oxide |  |  | 5.0 |  |
| Dipentamethylene thiuram tetrasulfide | 1.0 | 0.75 |  | 1.5 |
| Benzothiazyldisulfide |  | 0.75 |  | 1.5 |
| 2-Mecarptothiazoline |  |  | 0.5 |  |
| Nickel dibutyl dithiocarbamate |  | 1.0 |  |  |
| Butyraldehyde-aniline antioxidant | 2.0 | 2.0 |  | 2.0 |
| Phenyl betanaphthylamine antioxidant |  |  | 2.0 |  |

Thus, it will be seen that a titanium dioxide stock was used for the comparative tests of Tables I and II while various black stocks were used in Table III, the curing agents, anti-oxidants, etc. being adapted to the elastomer used, and the carbon black being adjusted so as to give a constant ratio, by volume, to the elastomer.

*Table I*

| Number | 1 | 2 | 3 | 4 | 5 | 6 | 7 | 8 | 9 |
|---|---|---|---|---|---|---|---|---|---|
| Density of polyethylene | 0.935 | 0.954 | 0.956 | 0.954 | 0.954 | 0.954 | 0.916 | 0.916 | 0.925 |
| Melt index of polyethylene | 20 | 15 | 22 | 80 | 80 | 80 | 10 | 10 | 72 |
| Cl, percent | 39.2 | 39.2 | 39.7 | 39.0 | 44.6 | 48.0 | 29.0 | 43.4 | 40.1 |
| S, percent | 1.2 | 1.2 | 2.4 | 1.3 | 1.2 | 1.1 | 1.3 | 1.3 | 1.6 |
| Viscosity, Mooney | 32 | 35 | 23 | 4 | 4 | 11 | 16 | 52 | 32 |
| Modulus, 100% p.s.i. | 650 | 400 | 350 | 150 | 150 | 430 | 600 | 1,120 | 1,250 |
| Elongation at break, percent | 480 | 520 | 560 | 800 | 760 | 600 | 400 | 360 | 240 |
| Tensile strength, p.s.i. | 2,500 | 3,575 | 4,025 | 1,500 | 1,600 | 2,360 | 1,900 | 2,800 | 2,810 |

*Table II*

| Number | 10 | 11 | 12 | 13 | 14 | 15 | 16 | 17 | 18 | 19 |
|---|---|---|---|---|---|---|---|---|---|---|
| Density of polyethylene | 0.960 | 0.947 | 0.947 | 0.947 | 0.960 | 0.960 | 0.960 | 0.953 | 0.953 | 0.960 |
| Melt Index | 17 | 2.0 | 2.0 | 2.0 | 0.9 | 0.9 | 0.9 | 0.5 | 0.5 | 0.2 |
| Ratio, $M_w/M_n$ | 5 | 25 | 25 | 25 | 15 | 15 | 15 | 6 | 6 | 15 |
| Cl, Percent | 41.3 | 38.2 | 38.7 | 33.2 | 38.5 | 39.1 | 42.6 | 39.8 | 39.4 | 39.0 |
| S, Percent | 0.95 | 1.44 | 0.41 | 0.23 | 1.03 | 0.12 | 0.65 | 0.78 | 1.09 | 1.50 |
| Viscosity, Mooney |  | 36 | 14 |  | 51 | 44 | 69 |  |  |  |
| Modulus, 100% p.s.i. | 450 | 310 | 180 | 140 | 340 | 175 | 440 | 280 | 330 | 700 |
| Elongation at Break, Percent | 475 | 450 | 660 | 950 | 475 | 795 | 475 | 510 | 460 | 400 |
| Tensile Strength, p.s.i. | 4,170 | 3,750 | 3,000 | 2,300 | 3,975 | 3,800 | 3,950 | 4,950 | 4,900 | 4,600 |

Table III

|  | Chlorosulfonated Polyethylene | | Commercial Polychloroprene | Commercial Butadiene-acrylonitrile copolymer |
|---|---|---|---|---|
|  | Present Invention No. 3, Table I | Prior Art No. 7, Table I | | |
| Modulus at 100%, p.s.i. | 1,025 | 950 | 350 | 375 |
| Tensile strength, p.s.i. | 3,225 | 2,750 | 3,700 | 2,825 |
| Elongation at break, percent | 290 | 260 | 440 | 480 |
| Permanent set at break, percent | 7 | 8 | 4 | 8 |
| Hardness, Shore A | 70 | 71 | 62 | 60 |
| Tear, Winkleman, lbs./in.: | | | | |
| 70° F | 70 | 41 | | |
| 212° F | 165 | 121 | | |
| Modulus ⎫ | 375 | 700 | 375 | 325 |
| Tensile ⎬ measured at 212° F | 3,000 | 1,925 | 2,250 | 1,825 |
| Elongation ⎭ | 370 | 230 | 330 | 400 |
| Percent Volume increase in: | | | | |
| Water, 70° C., 14 days | 7.6 | 5.4 | 18.0 | 14.3 |
| Nitric acid, conc., 7 days | 23.9 | 24.6 | dissolved | |
| ASTM, No. 3 oil¹ 70° C., 14 days | 44.9 | 125.3 | 85.3 | 10.6 |
| Reference Fuel B² 70° C., 14 days | 51.8 | 129.2 | 84.2 | 25.4 |

¹ A lubricating oil with high swelling properties, aniline point 69.5° C.
² A mixture of 70% iso-octane and 30% toluene by volume.

It will be seen from these tables that when a polyethylene with a density of 0.935 or 0.960 is chlorosulfonated so as to contain 38% to 48% chlorine, the cured products have good physical properties, comparable with or superior to those made with 29% chlorine from a lower density (0.916) polyethylene, (No. 7) representing the preferred composition disclosed by McAlevy in Patent 2,586,363. Note particularly that the modulus for the cured products of the present invention are substantially equal to or in many cases much less than those of the preferred McAlevy products. Thus the "stiffness" which would be reflected by a high modulus, such as is shown by the high chlorine products described by McAlevy (like Nos. 8 and 9), has been entirely overcome. No. 8 illustrates such a composition made from the same low density polyethylene as No. 7, but chlorinated to 43.4%. In this stiff compound, the modulus is almost twice as great, the elongation is low and the viscosity, another expression of "stiffness," is high. No. 9, another prior art high chlorine composition, even though made from a polyethylene of intermediate density and high melt index, still shows similar properties indicating "stiffness." The products of the present invention, as brought out in the tables, unexpectedly show none of this undesirable "stiffness" but, on the other hand, have good physical properties in the cured state, usually showing greatly increased tensile strength and elongation, and have the greatly improved solvent resistance associated with the high chlorine content. This absence of stiffness, in comparison with the stiffness of high-chlorine products from low-density polyethylenes, is particularly unexpected in view of the greater stiffness of the high-density polyethylenes themselves emphasized in British Patent 639,306 and United States Patent 2,762,791 referred to hereinbefore, and also in an article by R. V. Jones and P. J. Boeke, Ind. Eng. Chem., 48, 1155 (1956).

Table III gives a more detailed comparison of properties and includes a chlorosulfonated polyethylene, a polychloroprene, and a butadiene-acrylonitrile copolymer, which are widely used in industry, partly because of their oil-resistance and related properties. In two tests commonly used to determine swelling in hydrocarbons (last two lines of Table III) the product of the present invention (No. 3) is shown to be much more resistant than any except the acrylonitrile copolymer. At the same time, it swells less in water than either the polychloroprene or the acrylonitrile copolymer and is extremely resistant to concentrated nitric acid, which dissolves both the latter. The table again brings out that the product is equal or superior to the prior art chlorosulfonated polyethylene in physical properties which are characteristic of rubber and is at least comparable with and again is in many cases superior to the other elastomers in these properties. Note particularly the exceptional good retention of tensile properties at 212° F. and tear strength at both 70° F. and 212° F. The product also shows the excellent ozone and weather resistance characteristics of other chlorosulfonated polyethylenes.

EXAMPLE 4

Another chlorosulfonated product of this invention was made from a polyethylene having a density of 0.954 and a melt index of 5 by a process like that of Example 1 and contained 38.0% chlorine and 3.0% sulfur. When compounded and cured, using test compound A above and a 30-minute cure at 307° F., it gave a modulus (100%) of 580 p.s.i., a tensile strength of 3000 p.s.i., and an elongation at break of 310 lbs. After immersion in ASTM No. 3 oil for 7 days at 70° C., a test piece of this chlorosulfonated polyethylene was found to have elongated about 14%. A chlorosulfonated polyethylene, containing 28.6% chlorine and 2.0% sulfur and made from a polyethylene having a density of 0.916 and a melt index of 5, was found to have elongated about 24% after being similarly immersed in the same oil.

EXAMPLE 5

Another chlorosulfonated product, No. 21, of the present invention, was made from polyethylene of density 0.935 and melt index 20 by a process like that of Example 1 and contained 41.0% chlorine and 1.2% sulfur. It was compared with the prior art product, No. 7 of Table I, containing 29% chlorine and 1.3% sulfur, using a test formula like B, but with 40 parts of clay instead of 25 parts of carbon black, and curing for 30 min. at 307° F. (152° C.). Resistance of the cured stocks to olive oil and to lubricating oil was determined by measuring the percent volume increase as in Table III and also by comparing the tensile strength before and after immersion. The following Table IV summarizes the results for these two chlorosulfonated polyethylenes. It will be noted that No. 21 gives physical properties at least as good as those of the prior art chlorosulfonated product and that the resistance to oils is very much better. Because of the different compounding formulae, these results are not directly comparable with those of Table III, the high loading giving in general poorer physical properties but better oil resistance. It is clear, however, by comparing with the prior art chlorosulfonated polyethylene (No. 7) in each case that No. 21 with 41% chlorine has better resistance than No. 3 with 39% chlorine and that both are much better than No. 7 with 29% chlorine.

Table IV

|  | No. 21 | No. 7 (Prior Art) |
|---|---|---|
| Polyethylene density | 0.935 | 0.916 |
| Cl, percent | 41.0 | 29.0 |
| S, percent | 1.2 | 1.3 |
| Modulus at 100% | 1,600 | 1,075 |
| Tensile Strength | 1,975 | 1,675 |
| Elongation at Break | 310 | 260 |
| Percent Volume Increase: 70 hrs. at 70° C.— | | |
| In Olive Oil | 7.3 | 56.0 |
| In ASTM No. 3 Oil | 1.2 | 31.0 |
| Percent Change in Tensile Strength: 7 Days at 70° C.— | | |
| In Olive Oil | +7 | −17 |
| In ASTM No. 3 Oil | −4 | −52 |

On the other hand, when a polyethylene of high density was chlorosulfonated, while in finely divided solid form without a solvent, so as to contain 33.2% chlorine and 1.4% sulfur, compounded in the standard titanium dioxide stock, and cured for 30 minutes at 153° C., it gave a 30% elongation at break, a Shore A hardness of 96, a compression set of 65 after 22 hours at 70° C. Its elongation was less than 10% of that of a sample which had been homogeneously chlorosulfonated (in solution), and it had substantially no elastomeric properties.

It will be understood that the preceding examples are given for illustrative purposes solely and that this invention is not limited to the specific embodiments described therein. On the other hand, it will be apparent to those skilled in the art that many changes and variations may be made in the polyethylene employed and the amounts of chlorine and of sulfur contained in the chlorosulfonated products within the limits set forth in the general disclosure and in the methods employed for making, compounding and curing the products without departing from the spirit and scope of this invention.

It will be obvious from the foregoing that this invention provides new chlorosulfonated polyethylenes which are valuable materials having new, unobvious and unpredictable advantageous properties not possessed by chlorosulfonated polyethylenes of the prior art whereby they have novel qualities of utility of significant value to the art. Therefore, it is apparent that this invention constitutes a valuable advance in and contribution to the art.

This is a continuation-in-part of my copending application Serial No. 666,771, filed June 19, 1957.

The embodiments of the invention in which an exclusive property or privilege is claimed are defined as follows:

1. A curable homogeneously chlorosulfonated polyethylene having a chlorine content of from 38% to about 48% by weight and a sulfur content of from 0.1% to 3.0% by weight, the polyethylene prior to chlorosulfonation having a density of from 0.935 to about 0.960, a melt index of from 0.2 to about 200, and a solubility in carbon tetrachloride of at least 1% by weight.

2. A curable homogeneously chlorosulfonated polyethylene having a chlorine content of from 38% to about 48% by weight and a sulfur content of from 0.1% to 3.0% by weight, the polyethylene prior to chlorosulfonation having a density of from about 0.945 to about 0.960, a melt index of from 0.2 to about 200, and a solubility in carbon tetrachloride of at least 1% by weight.

3. A curable homogeneously chlorosulfonated polyethylene having a chlorine content of from 38% to about 48% by weight and a sulfur content of from 0.1% to 3.0% by weight, the polyethylene prior to chlorosulfonation having a density of from 0.935 to about 0.960, a melt index of from about 0.2 to about 20, and a solubility in carbon tetrachloride of at least 1% by weight.

4. A curable homogeneously chlorosulfonated polyethylene having a chlorine content of from 38% to about 48% by weight and a sulfur content of from 0.1% to 3.0% by weight, the polyethylene prior to chlorosulfonation having a density of from about 0.945 to about 0.960, a melt index of from about 0.2 to about 20, and a solubility in carbon tetrachloride of at least 1% by weight.

5. A curable homogeneously chlorosulfonated polyethylene having a chlorine content of from 38% to about 42% by weight and a sulfur content of from about 0.3% to about 1.2% by weight, the polyethylene prior to chlorosulfonation having a density of from about 0.945 to about 0.960, a melt index of from 0.2 to about 200, and a solubility in carbon tetrachloride of at least 1% by weight.

6. A curable homogeneously chlorosulfonated polyethylene having a chlorine content of from 38% to about 42% by weight and a sulfur content of from about 0.3% to about 1.2% by weight, the polyethylene prior to chlorosulfonation having a density of from about 0.945 to about 0.960, a melt index of from about 0.2 to about 20, and a solubility in carbon tetrachloride of at least 1% by weight.

7. A curable homogeneously chlorosulfonated polyethylene having a chlorine content of from 38% to about 48% by weight and a sulfur content of from 0.1% to 3.0% by weight, the polyethylene prior to chlorosulfonation having a density of from 0.935 to about 0.960, a melt index of from 0.2 to about 200, a ratio of weight average to number average molecular weight between 1 and 25 and a solubility in carbon tetrachloride of at least 1% by weight.

8. A curable homogeneously chlorosulfonated polyethylene having a chlorine content of from 38% to about 48% by weight and a sulfur content of from 0.1% to 3.0% by weight, the polyethylene prior to chlorosulfonation having a density of from about 0.945 to about 0.960, a melt index of from 0.2 to about 200, a ratio of weight average to number average molecular weight between 2 and 10 and a solubility in carbon tetrachloride of a least 1% by weight.

9. A curable homogeneously chlorosulfonated polyethylene having a chlorine content of from 38% to about 48% by weight and a sulfur content of from about 0.3% to about 1.2% by weight, the polyethylene prior to chlorosulfonation having a density of from 0.935 to about 0.960, a melt index of from about 0.2 to about 20, a ratio of weight average to number average molecular weight between 2 and 10 and a solubility in carbon tetrachloride of at least 1% by weight.

10. A curable homogeneously chlorosulfonated polyethylene having a chlorine content of from 38% to about 42% by weight and a sulfur content of from about 0.3% to about 1.2% by weight, the polyethylene prior to chlorosulfonation having a density of from about 0.945 to about 0.960, a melt index of from about 0.2 to about 20, a ratio of weight average to number average molecular weight between 2 and 10 and a solubility in carbon tetrachloride of at least 1% by weight.

References Cited in the file of this patent

UNITED STATES PATENTS

| 2,640,048 | Beekley | May 26, 1953 |
| 2,659,707 | Youngquist et al. | Nov. 17, 1953 |
| 2,723,257 | McAtevy | Nov. 8, 1955 |
| 2,791,576 | Field et al. | May 7, 1957 |
| 2,809,950 | Bowers | Oct. 15, 1957 |

OTHER REFERENCES

Brooks et al., India Rubber World, March 1953, pp. 791–93.

UNITED STATES PATENT OFFICE
CERTIFICATE OF CORRECTION

Patent No. 2,982,759                                            May 2, 1961

Ralph Otto Heuse

It is hereby certified that error appears in the above numbered patent requiring correction and that the said Letters Patent should read as corrected below.

Column 2, line 48, for "so-caled" read -- so-called --; line 55, for "hve" read -- have --; column 5, line 19, for "hours" read -- hour --; column 6, line 24, for "II" read -- III --; column 8, line 33, for "characteristics" read -- characteristic --; column 9, lines 22 and 23, for "denhity" read -- density --; column 10, line 69, for "McAtavy" read -- McAlevy --.

Signed and sealed this 3rd day of October 1961.

(SEAL)
Attest:

ERNEST W. SWIDER                                  DAVID L. LADD
Attesting Officer                                       Commissioner of Patents
                                                                           USCOMM-DC